US012682170B2

(12) United States Patent
Li et al.

(10) Patent No.: US 12,682,170 B2
(45) Date of Patent: Jul. 14, 2026

(54) CONDENSING A DOCUMENT FOR ENHANCED ANALYSIS AND PROCESSING

(71) Applicant: International Business Machines Corporation, Armonk, NY (US)

(72) Inventors: Dong Rui Li, Beijing (CN); Ye Chen, Beijing (CN); Zai Ming Lao, Beijing (CN); Xue Lan Zhang, Beijing (CN); Xue Xu, Beijing (CN); Wei U Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 18/447,365

(22) Filed: Aug. 10, 2023

(65) Prior Publication Data

US 2025/0053746 A1     Feb. 13, 2025

(51) Int. Cl.
G06F 40/30          (2020.01)
G06F 40/166         (2020.01)
G06F 40/40          (2020.01)

(52) U.S. Cl.
CPC ............ *G06F 40/30* (2020.01); *G06F 40/166* (2020.01); *G06F 40/40* (2020.01)

(58) Field of Classification Search
CPC ......... G06F 40/30; G06F 40/166; G06F 40/40
See application file for complete search history.

(56) References Cited

U.S. PATENT DOCUMENTS

| | | |
|---|---|---|
| 5,708,825 A | 1/1998 | Sotomayor |
| 10,452,904 B2 | 10/2019 | Northrup et al. |
| 11,544,947 B2 | 1/2023 | Yanamandra et al. |
| 11,593,555 B1 * | 2/2023 | Anthony ............... G06F 40/205 |
| 11,842,143 B1 * | 12/2023 | Li ........................... G06F 40/166 |
| 2003/0212673 A1 * | 11/2003 | Kadayam ........... G06F 16/9532 |
| 2006/0036596 A1 | 2/2006 | Zhang et al. |
| 2011/0295879 A1 | 12/2011 | Logis et al. |
| 2017/0052943 A1 * | 2/2017 | Owens ................. G06F 40/143 |
| 2019/0171872 A1 * | 6/2019 | Northrup .............. G06F 16/284 |
| 2019/0171875 A1 * | 6/2019 | Northrup .............. G06F 40/163 |
| 2021/0286992 A1 | 9/2021 | Yanamandra et al. |

(Continued)

FOREIGN PATENT DOCUMENTS

CN          111783399 A      10/2020

OTHER PUBLICATIONS

Hendrik Strobelt et al., "Document Cards: A Top Trumps Visualization for Documents", IEEE Transactions on Visualization and Computer Graphics 15, Published Oct. 23, 2009, pp. 1145-1152.

(Continued)

*Primary Examiner* — Pierre Louis Desir
*Assistant Examiner* — Keisha Y. Castillo-Torres
(74) *Attorney, Agent, or Firm* — Stosch Sabo

(57)          ABSTRACT

Disclosed embodiments provide techniques for creating a smaller version of an original document. An ontology is defined, and a document type for an original document is determined, based on the ontology. Multiple key-value pairs (KVPs) are extracted from the original document based on the document type. Pages in the original document that include one or more KVPs are identified, and the smaller, condensed version includes the identified pages from the original document.

19 Claims, 10 Drawing Sheets

(56) References Cited

U.S. PATENT DOCUMENTS

| 2024/0221407 | A1* | 7/2024 | Hu | ........................... | G06N 3/08 |
| 2025/0005007 | A1* | 1/2025 | Hariharan | ............... | G06F 16/22 |

OTHER PUBLICATIONS

Alexios Gidiotis et al., "A Divide-and-Conquer Approach to the Summarization of Long Documents", IEEE/ACM Transactions on Audio, Speech, and Language Processing, Published Sep. 23, 2020, 14 pages.
Wei-Fan Chen et al., "Abstractive Snippet Generation", Proceedings of the Web Conference 2020, Published Mar. 15, 2020, 11 pages.
No Author, "Content Platform Engine", https://www.ibm.com/docs/en/filenet-p8-platform/5.2.1?topic=architecture-content-platform-engine, Mar. 5, 2021, 3 pages.
No Author, "IBM Automation Document Processing", https://web.archive.org/web/20231130112731/https://www.ibm.com/products/document-processing, Nov. 30, 2023, 7 pages.
No Author, "IBM Business Automation Workflow", https://web.archive.org/web/20230512025229/https://www.ibm.com/products/business-automation-workflow, May 12, 2023, 8 pages.

* cited by examiner

100

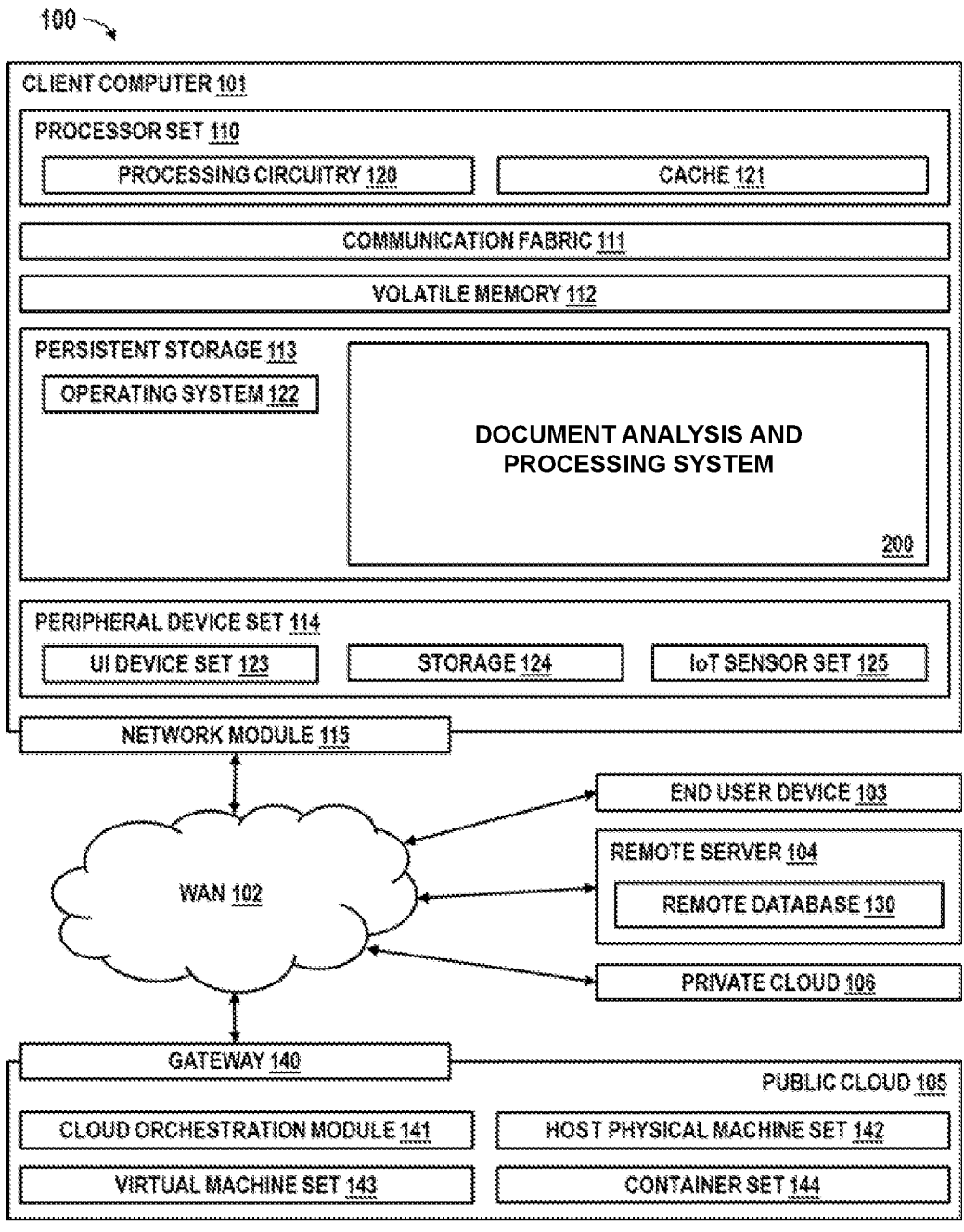

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

DOCUMENT ANALYSIS AND
PROCESSING SYSTEM

200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

| 521 | 522 | 523 |
|---|---|---|
| Mortgage date | Type: Date | Mandatory: true | 501 |
| Mortgagor | Type: Name | Mandatory: true | 502 |
| Mortgagee | Type: Name | Mandatory: true | 503 |
| Property Address | Type: Address | Mandatory: true | 504 |
| Sum | Type: Currency | Mandatory: true | 505 |
| Interest | Type: Integer | Mandatory: true | 506 |
| Mortgagor Age | Type: Integer | Mandatory: false | 507 |

```
{
    "DocumentId": "a29947f9-4bfd-44da-bc6a-d6a9ab8daa97",
    "DocumentName": "MA_001_1_1.pdf",
    "Classification": {
        "DocumentType": {
            "Actual": "MortgageAgreement",
            "Confidence": "High",
        }
    },
    "Fields": [
        {
            "Key": "MortgageDate",
            "Value": "2023-05-26",
            "Location": "1510, 473, 182, 32",
            "PageNumber": 0,
        },
        {
            "Key": "Mortgagor",
            "Value": "Charlie",
            "Location": "1510, 644, 142, 33",
            "PageNumber": 0,
        },
    ]
}
```

600

602
603
604
606
610
612
614
616
618
620
622
624
626
628

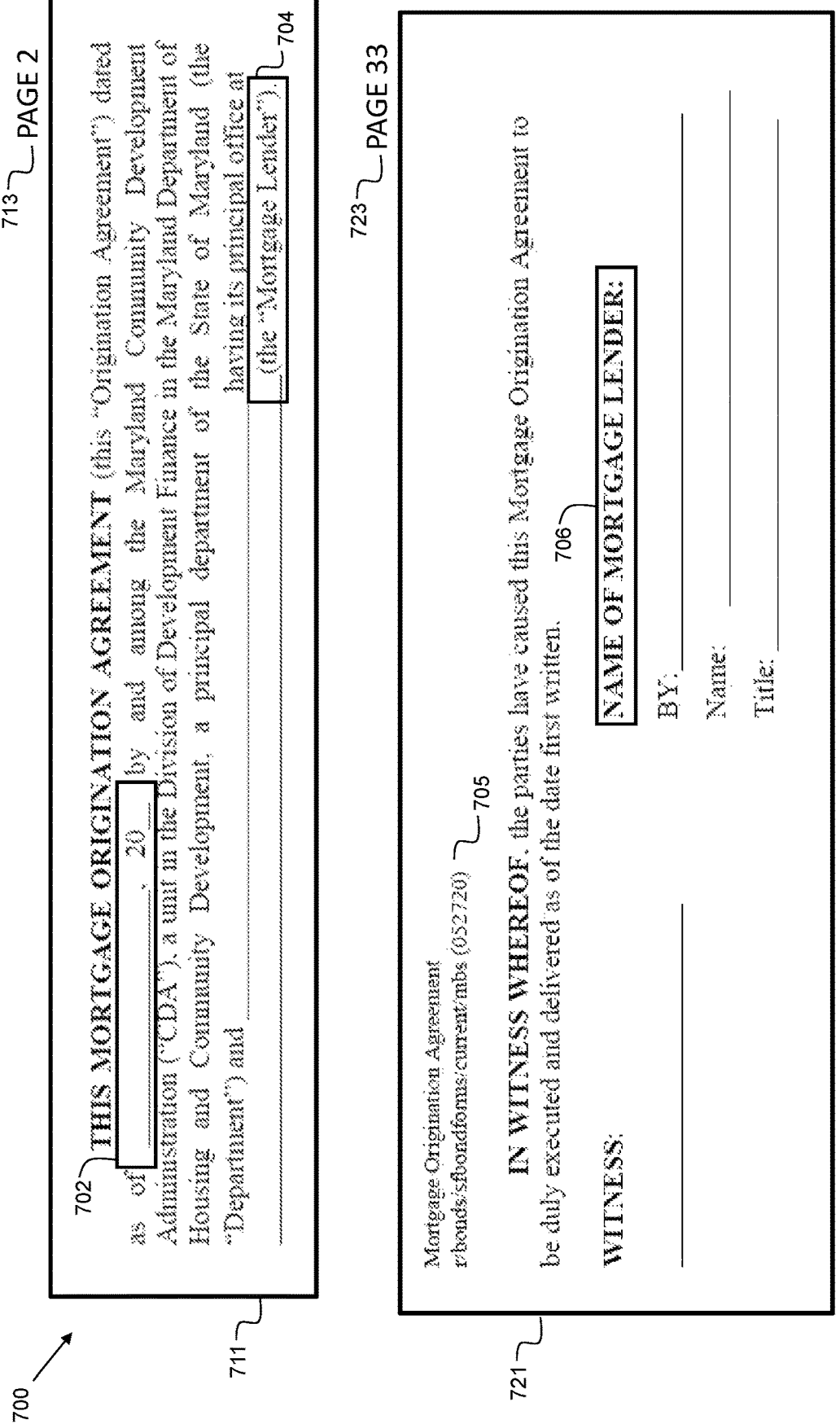

700

713 — PAGE 2

702

THIS MORTGAGE ORIGINATION AGREEMENT (this "Origination Agreement") dated as of ____, 20__, by and among the Maryland Community Development Administration ("CDA"), a unit in the Division of Development Finance in the Maryland Department of Housing and Community Development, a principal department of the State of Maryland (the "Department") and ____ having its principal office at ____

(the "Mortgage Lender").

704

711

723 — PAGE 33

Mortgage Origination Agreement
r/bonds/sfbondforms/current/mbs (052720)

705

IN WITNESS WHEREOF, the parties have caused this Mortgage Origination Agreement to be duly executed and delivered as of the date first written.

WITNESS:

NAME OF MORTGAGE LENDER:

706

BY: _____

Name: _____

Title: _____

Figure 8:
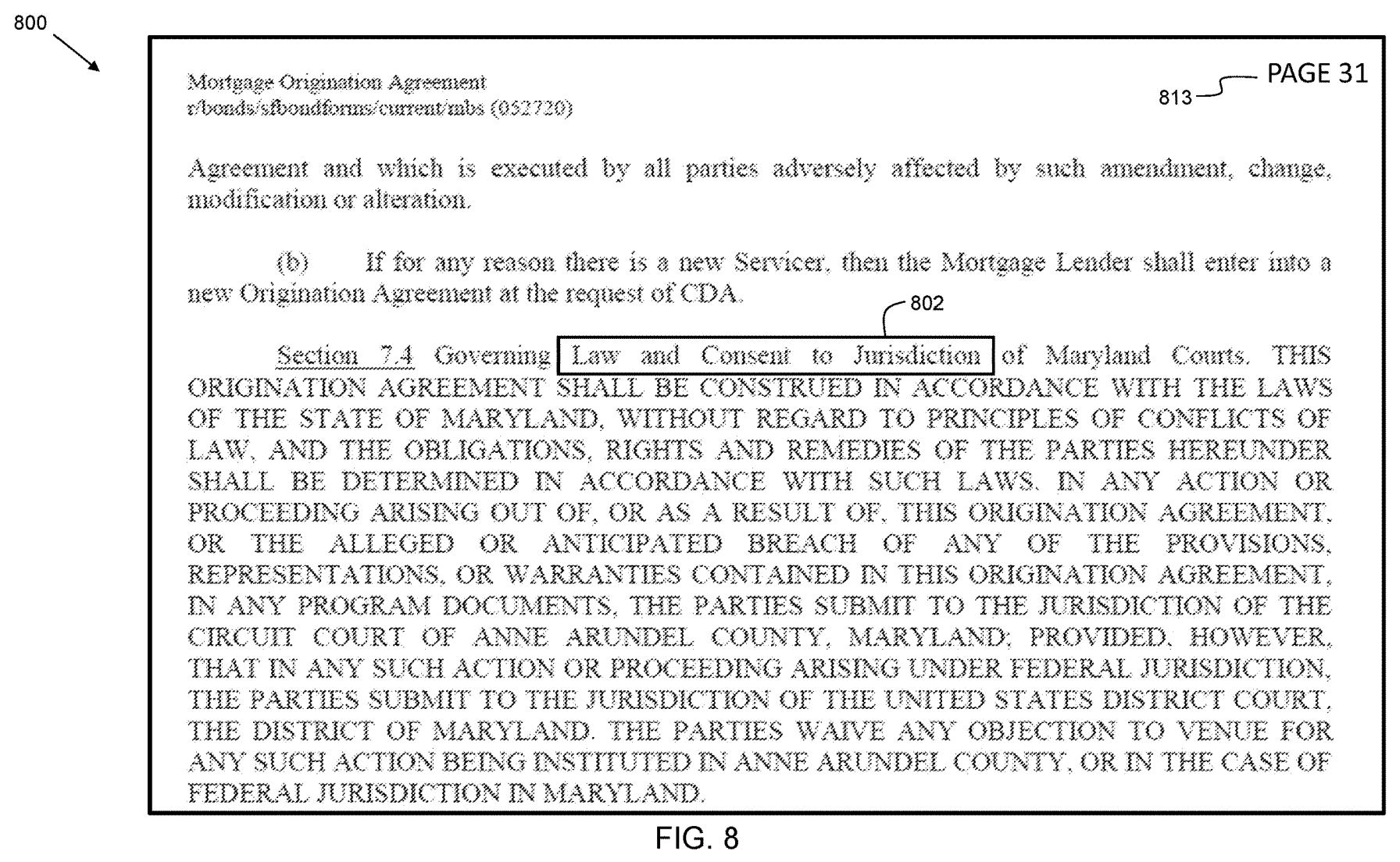

PAGE 31 — 813

Mortgage Origination Agreement
r/bonds/cbondforms/currentmos (052720)

Agreement and which is executed by all parties adversely affected by such amendment, change, modification or alteration.

(b) If for any reason there is a new Servicer, then the Mortgage Lender shall enter into a new Origination Agreement at the request of CDA.

— 802

Section 7.4 Governing Law and Consent to Jurisdiction of Maryland Courts. THIS ORIGINATION AGREEMENT SHALL BE CONSTRUED IN ACCORDANCE WITH THE LAWS OF THE STATE OF MARYLAND, WITHOUT REGARD TO PRINCIPLES OF CONFLICTS OF LAW, AND THE OBLIGATIONS, RIGHTS AND REMEDIES OF THE PARTIES HEREUNDER SHALL BE DETERMINED IN ACCORDANCE WITH SUCH LAWS. IN ANY ACTION OR PROCEEDING ARISING OUT OF, OR AS A RESULT OF, THIS ORIGINATION AGREEMENT, OR THE ALLEGED OR ANTICIPATED BREACH OF ANY OF THE PROVISIONS, REPRESENTATIONS, OR WARRANTIES CONTAINED IN THIS ORIGINATION AGREEMENT, IN ANY PROGRAM DOCUMENTS, THE PARTIES SUBMIT TO THE JURISDICTION OF THE CIRCUIT COURT OF ANNE ARUNDEL COUNTY, MARYLAND; PROVIDED, HOWEVER, THAT IN ANY SUCH ACTION OR PROCEEDING ARISING UNDER FEDERAL JURISDICTION, THE PARTIES SUBMIT TO THE JURISDICTION OF THE UNITED STATES DISTRICT COURT, THE DISTRICT OF MARYLAND. THE PARTIES WAIVE ANY OBJECTION TO VENUE FOR ANY SUCH ACTION BEING INSTITUTED IN ANNE ARUNDEL COUNTY, OR IN THE CASE OF FEDERAL JURISDICTION IN MARYLAND.

CONDENSING A DOCUMENT FOR ENHANCED ANALYSIS AND PROCESSING

FIELD

The present invention relates generally to computer systems, and more particularly, to computer systems for document analysis and processing.

BACKGROUND

Legal and business documents play a pivotal role in establishing and maintaining the integrity, transparency, and functionality of any organization or business venture. Legal documents ensure that individuals and businesses operate within the framework of the law. By adhering to regulations and obligations set forth in legal documents, organizations can minimize the risk of legal disputes, penalties, and reputational damage. Business documents such as contracts, agreements, and terms of service can provide a clear understanding of rights, responsibilities, and expectations for all parties involved. Documents of this nature can help prevent misunderstandings and provide a foundation for resolving conflicts in a fair and equitable manner. Legal and business documents can serve as a protective shield against potential risks. For instance, confidentiality agreements can safeguard sensitive information, non-disclosure agreements can protect intellectual property, and liability waivers can minimize exposure to legal claims. Bylaws, articles of incorporation, and corporate governance documents can outline the organizational structure, roles, and decision-making processes within a company. They can stipulate internal policies, legal requirements, and ethical standards, promoting transparency, accountability, and responsible business practices. Thus, legal and business documents can serve as the backbone of any organization, providing a solid foundation for legal compliance, protection, risk management, financial stability, and successful business relationships.

SUMMARY

In one embodiment, there is provided a computer-implemented method for document processing, comprising: determining a document type for a first document, based on an ontology associated with the first document, wherein the first document includes a plurality of pages; extracting a plurality of key-value pairs (KVPs) from the first document based on the determined document type; identifying an excerpt of the first document that contains a KVP of the plurality of KVPs; and creating a condensed document, wherein the condensed document includes the identified excerpt of the first document, and wherein the condensed document excludes at least one other excerpt of the first document that is not identified as containing a KVP of the plurality of KVPs.

In another embodiment, there is provided an electronic computation device comprising: a processor; a memory coupled to the processor, the memory containing instructions, that when executed by the processor, cause the electronic computation device to: determine a document type for a first document, based on an ontology associated with the first document, wherein the first document includes a plurality of pages; extract a plurality of key-value pairs (KVPs) from the first document based on the determined document type; identify an excerpt of the first document that contains a KVP of the plurality of KVPs; and create a condensed document, wherein the condensed document includes the identified excerpt of the first document, and wherein the condensed document excludes at least one other excerpt of the first document that is not identified as containing a KVP of the plurality of KVPs.

A computer program product for an electronic computation device comprising a computer readable storage medium having program instructions embodied therewith, the program instructions executable by a processor to cause the electronic computation device to: determine a document type for a first document, based on an ontology associated with the first document, wherein the first document includes a plurality of pages; extract a plurality of key-value pairs (KVPs) from the first document based on the determined document type; identify an excerpt of the first document that contains a KVP of the plurality of KVPs; and create a condensed document, wherein the condensed document includes the identified excerpt of the first document, and wherein the condensed document excludes at least one other excerpt of the first document that is not identified as containing a KVP of the plurality of KVPs.

BRIEF DESCRIPTION OF THE DRAWINGS

FIG. 1 is an exemplary computing environment in accordance with disclosed embodiments.

FIG. 7 shows exemplary document sections containing KVPs in accordance with disclosed embodiments.

FIG. 8 shows an exemplary supplemental page in accordance with disclosed embodiments.

Figure 2:
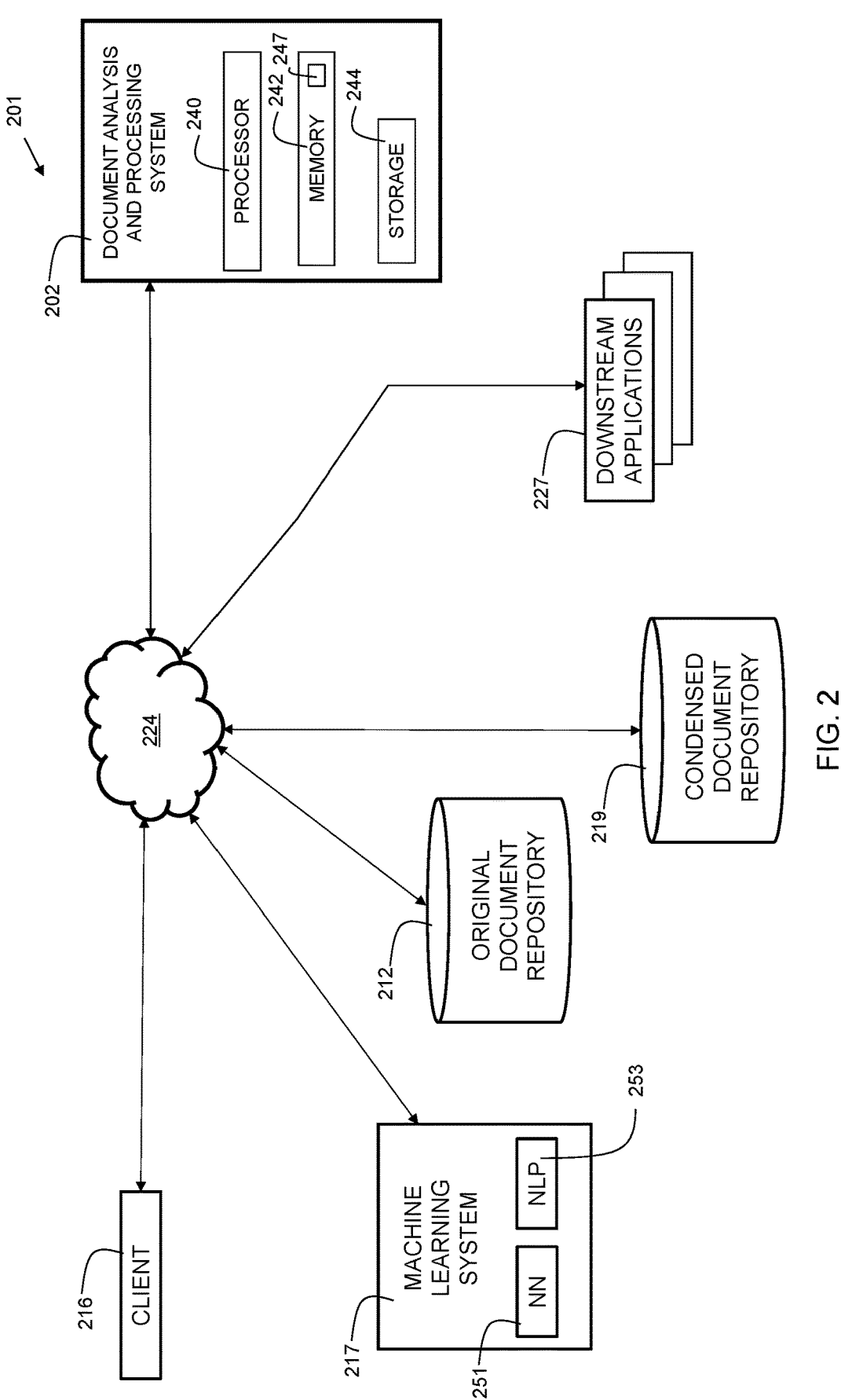
FIG. 2 is an exemplary ecosystem in accordance with disclosed embodiments.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Business and legal documents can be lengthy, sometimes containing hundreds of pages. Intake of large numbers of such documents can pose multiple technical challenges. As the size of the document increases, the search performance tends to decrease. Searching large documents requires significant computational resources and can result in slower response times, especially when using traditional search algorithms. Indexing large documents can be time-consuming and resource intensive. Building an efficient index structure to enable quick searching becomes more challenging as the document size increases. Storing large documents requires significant storage capacity. Managing and accessing the stored data efficiently can become challenging.

In many cases, a typical user of such documents may be interested in a small subset of the information contained in the documents. Examples of these types of documents can include mortgage applications, wills, automobile loan applications, rental agreements, insurance policy documents, and so on. Disclosed embodiments address the aforementioned issues by taking advantage of the fact that for many documents, only a small subset of the document is of interest to a user. As an example, in a mortgage application, a user may typically be interested in the pages that contain information about the lender, borrower, and the property details. Disclosed embodiments analyze a document by utilizing key-value pairs (KVPs), and create a small version of an original document. In one or more embodiments, indexing and other document processes are performed on the small version, thereby conserving computer resources such as processing cycles, network bandwidth, and/or data storage.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 shows an exemplary computing environment 100 in accordance with disclosed embodiments. Computing environment 100 contains an example of an environment for the execution of at least some of the computer code involved in performing the inventive methods, such as document analysis and processing system block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is an exemplary ecosystem 201 in accordance with disclosed embodiments. Document Analysis and Processing System (DAPS) 202 comprises a processor 240, a memory 242 coupled to the processor 240, and storage 244. DAPS 202 is an electronic computation device. The memory 242 contains program instructions 247, that when executed by the processor 240, perform processes, techniques, and implementations of disclosed embodiments. Memory 242 can include dynamic random-access memory (DRAM), static random-access memory (SRAM), magnetic storage, and/or a read only memory such as flash, EEPROM, optical storage, or other suitable memory, and should not be construed as being a transitory signal per se. In some embodiments, storage 244 may include one or more magnetic storage devices such as hard disk drives (HDDs). Storage 244 may additionally include one or more solid state drives (SSDs). The DAPS 202 is configured to interact with other elements of ecosystem 201. DAPS 202 is connected to network 224, which can include the Internet, a wide area network, a local area network, and/or any other suitable network.

Ecosystem 201 may include one or more client devices, indicated as 216. Client device 216 can include a laptop computer, desktop computer, tablet computer, or other suitable computing device. Client device 216 may be used to interact with DAPS 202 to enable end-users to efficiently view and/or search through a small (condensed) version of an original document. The small version (condensed version) of an original document is a document that contains a subset of pages from a multiple-page original document. Additionally, client device 216 may be used to configure features in the DAPS 202, including features such as defining an ontology for a given document type, creating and/or editing document type profiles, key-value pair information, creating regular expressions, and/or other associated configuration data.

Ecosystem 201 may include an original document repository 212. The original document repository may include one or more databases, files, and/or other data structures stored on a medium such as one or more hard disks, cloud storage devices, and/or other suitable storage devices. In some embodiments, the original documents range in size from 20 pages to 2,000 pages. In some embodiments, the original documents may have more or fewer pages than that.

Ecosystem 201 may include a condensed document repository 219. The condensed document repository may include one or more databases, files, and/or other data structures stored on a medium such as one or more hard disks, cloud storage devices, and/or other suitable storage devices. In some embodiments, the condensed document repository includes files that are smaller versions, in which (e.g., a page, section, paragraph, excerpt, etc., containing) relevant information is retained while other information is discarded, of the original documents in original document repository 212. In some embodiments, the subset ranges from 2 percent to 20 percent of the page count of the corresponding original document. As an example, a 40-page original document may have a corresponding smaller version that has a page count ranging from 2 pages to 5 pages.

Ecosystem 201 may include machine learning system 217. The machine learning system 217 can include a neural network (NN) 251, and/or a natural language processing (NLP) module 253. In some embodiments, the machine learning system 217 may include a Support Vector Machine (SVM), Decision Tree, Recurrent Neural Network (RNN), Long Short Term Memory Network (LSTM), Radial Basis Function Network (RBFN), Multilayer Perceptron (MLP), and/or other suitable neural network type. In embodiments, the machine learning system 217 is trained using supervised learning techniques.

The NLP module 253 may include software and/or hardware for performing Natural Language Processing (NLP). NLP is a subfield of artificial intelligence that involves teaching computers to understand, interpret, and/or generate human language. NLP works by breaking down human language into its constituent parts and analyzing them using various algorithms and techniques. In one or more embodiments, the NLP process includes tokenization, which can include breaking down a piece of text into individual words or phrases. The NLP process can further include Part-of-speech (POS) tagging. POS tagging can include analyzing each token and assigning it a part of speech, such as noun, verb, adjective, or adverb. The NLP process can further include parsing, which involves analyzing the syntactic structure of a sentence to identify the relationships between the words and phrases. The process can include entity detection, which involves identifying and categorizing named entities in a piece of text, such as people, places, organizations, and dates. In one or more embodiments, the NLP process may be used on business documents and/or legal documents to identify KVPs, and acquire metadata associated with the KVPs, such as a page number and/or a location of the KVP within the page and/or document. In this way, pages of an original document that contain relevant information can be automatically extracted and used for creation of a smaller version of the document in one or more embodiments.

Ecosystem 201 can include one or more downstream applications 227. The downstream applications can include an indexer, a tokenizer, a part of speech (POS) analyzer, a named entity recognition (NER) process, a text classifier, a language detector, a summarization process, and/or other suitable applications. In embodiments, the downstream applications 227 can take as input, documents from the original document repository 212 and/or the condensed document repository 219. In some embodiments, the downstream applications 227 may utilize input from the original document repository 212 as part of a training process. Then, after the system is trained, during a runtime operation, the downstream applications 227 may utilize input from the condensed document repository 219, in order to efficiently process document information, without needing to spend compute resources on irrelevant information contained within the original documents.

Figure 3:
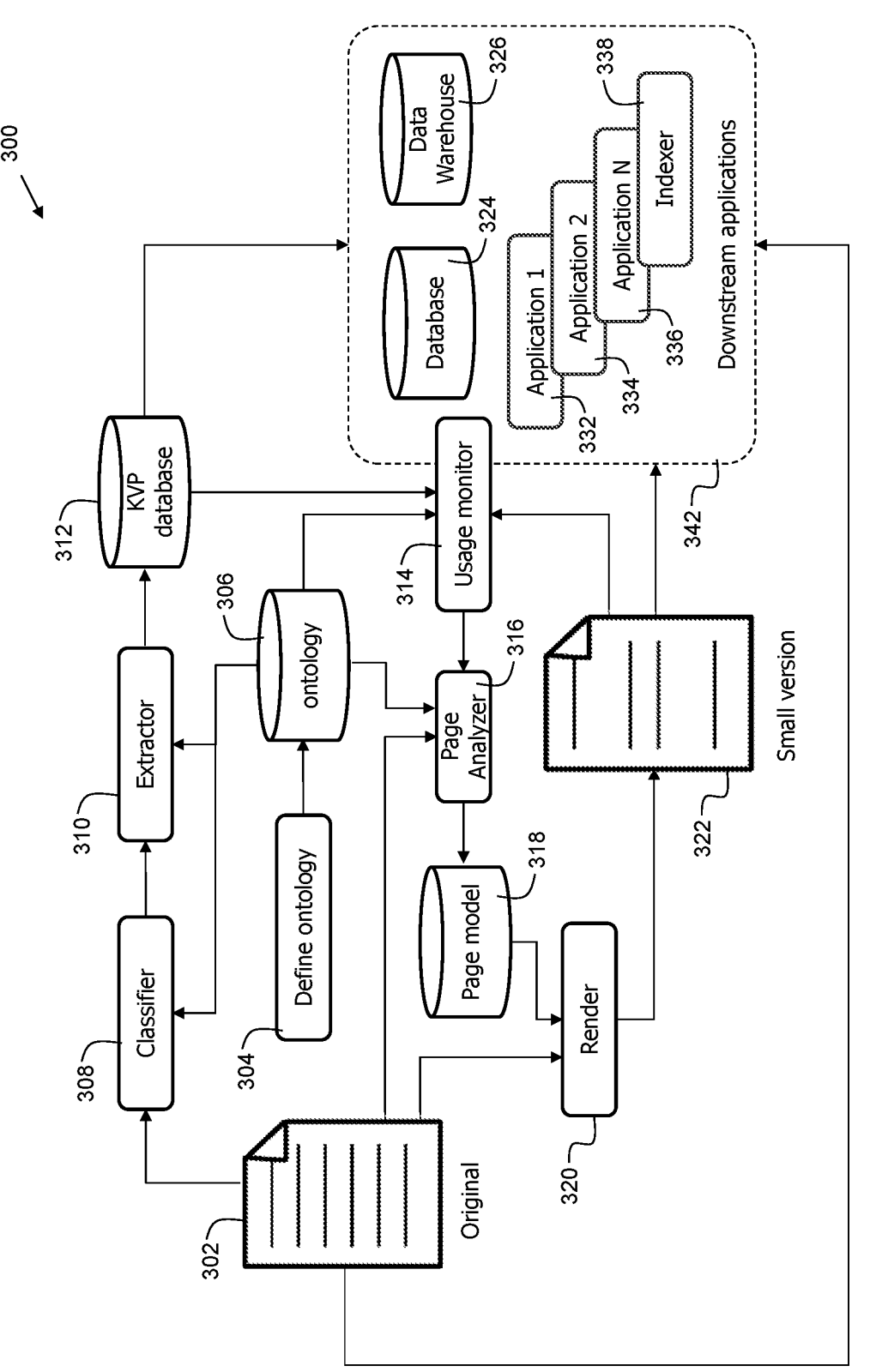
FIG. 3 is a block diagram illustrating system training in accordance with disclosed embodiments.

FIG. 3 is a block diagram 300 illustrating system training in accordance with disclosed embodiments. For training of systems of disclosed embodiments, an original document 302 is input to the system. The original document can be a text document, rich text format (RTF) document, docx format, portable document format (PDF), and/or other suitable document type. The original document has a document type associated with it. The document type can include a mortgage application, insurance policy, rental agreement, and/or other document type corresponding to a legal and/or business document. In one or more embodiments, the original document exceeds 30 pages. At block 304, an ontology for the document type is defined. The ontology can include a set of fields that are optional, expected, and/or mandatory in a given document type. In one or more embodiments, the ontology may be manually defined by a user, automatically generated from a domain knowledge graph, and/or automatically generated from document analyzing. For example, the ontology creation can include analyzing the same type of documents to identify common characters/fields.

The original document 302 is input to classifier 308. In one or more embodiments, the classifier identifies the type associated with the original document according to a fingerprint defined in the ontology. The fingerprint can include an alphanumeric text string, and/or a hash of character and/or image data within the original document. In one or more embodiments, the hash includes an md5 hash, sha256 hash, and/or other suitable hash type. Once the type is determined, the original document is input to an extractor 310 which is configured for the identified document type. As an example, if the document type for the original document is determined as a mortgage agreement for the state of Maryland, then the extractor is configured to extract KVPs corresponding to mortgage agreements for the state of Maryland. The extracted KVPs are stored in KVP database 312, and also input to downstream applications 342. Downstream applications 342 can include a database 324 and/or data warehouse 326. A data warehouse is a centralized repository that stores large volumes of structured, semi-structured, and sometimes unstructured data from various sources within an organization. The data warehouse supports functions such as reporting, analysis, and decision-making. The downstream applications can further include one or more applications, such as indexer 338, language analyzers, language translators, sentiment analyzers, and so on, indicated generally as applications 332, 334, and 336. While four downstream applications are shown in FIG. 3, in practice, there can be more or fewer downstream applications in some embodiments.

In one or more embodiments, the indexer 338 processes and analyzes textual content to create an index of searchable terms. The index allows for efficient and fast retrieval of relevant documents when users perform a search query. In one or more embodiments, the indexer 338 starts by receiving a collection of documents to be indexed. The indexer performs preprocessing tasks like tokenization, lowercasing, and removal of stop words (commonly used words like "the," "and," etc.) to convert the documents into a more manageable form. The indexer may be configured to extract individual terms (words or phrases) from the preprocessed documents. Each term represents a potential search query keyword. The indexer 338 filters out irrelevant terms, such as very short words or terms with little significance. In embodiments, the indexer 338 determines the frequency of each term within a document. This information is used to prioritize and rank documents based on the relevance to a search query. Common term frequency metrics include raw term frequency (number of occurrences) and normalized term frequency (TF-IDF, which considers the frequency relative to the entire collection). In embodiments, the indexed data is stored in a suitable data storage system, that is optimized for fast retrieval, such as a disk-based file system or an in-memory data structure. The index can be organized into multiple files or partitions for scalability and distributed processing.

The ontology 306 and KVP data from KVP database 312 are also provided to a usage monitor 314. The usage monitor can be a module or program configured to monitor the relationship between extracted KVPs and fields in the database/data warehouse. The usage of the KVPs is monitored in the database/data warehouse (through database or ETL (Extract-Transform-Load) log analyzing, SQL statements analyzing, etc.). Fields that are not used, or rarely used, may be deemed irrelevant, and pages in the original document that contain unused or rarely used fields may be omitted from the small (condensed) version 322 of the document. In some embodiments, a smaller version document (condensed document) includes a subset of the pages in a corresponding original document. In embodiments, the condensed document excludes at least one other excerpt of the first document that is not identified as containing a KVP.

The ontology 306 and output of usage monitor 314 are also provided to a page analyzer 316. The page analyzer 316 is a module, program, or application that consolidates ontology definition, usage monitor data, and/or KVP data to determine the pages that contain frequently used KVP data. The output of the page analyzer 316 is a page model 318. The page model comprises the page information of each document type, which can be used by the render module 320 to generate the small version 322 of the original document 302. In one or more embodiments, as part of a training and/or periodic retraining process, the small versions are inspected manually to check for accuracy. If the small version 322 is missing important information, the ontology can be updated to include additional terms from the original document 302 that are to be selected for inclusion in the small version 322.

Figure 4:
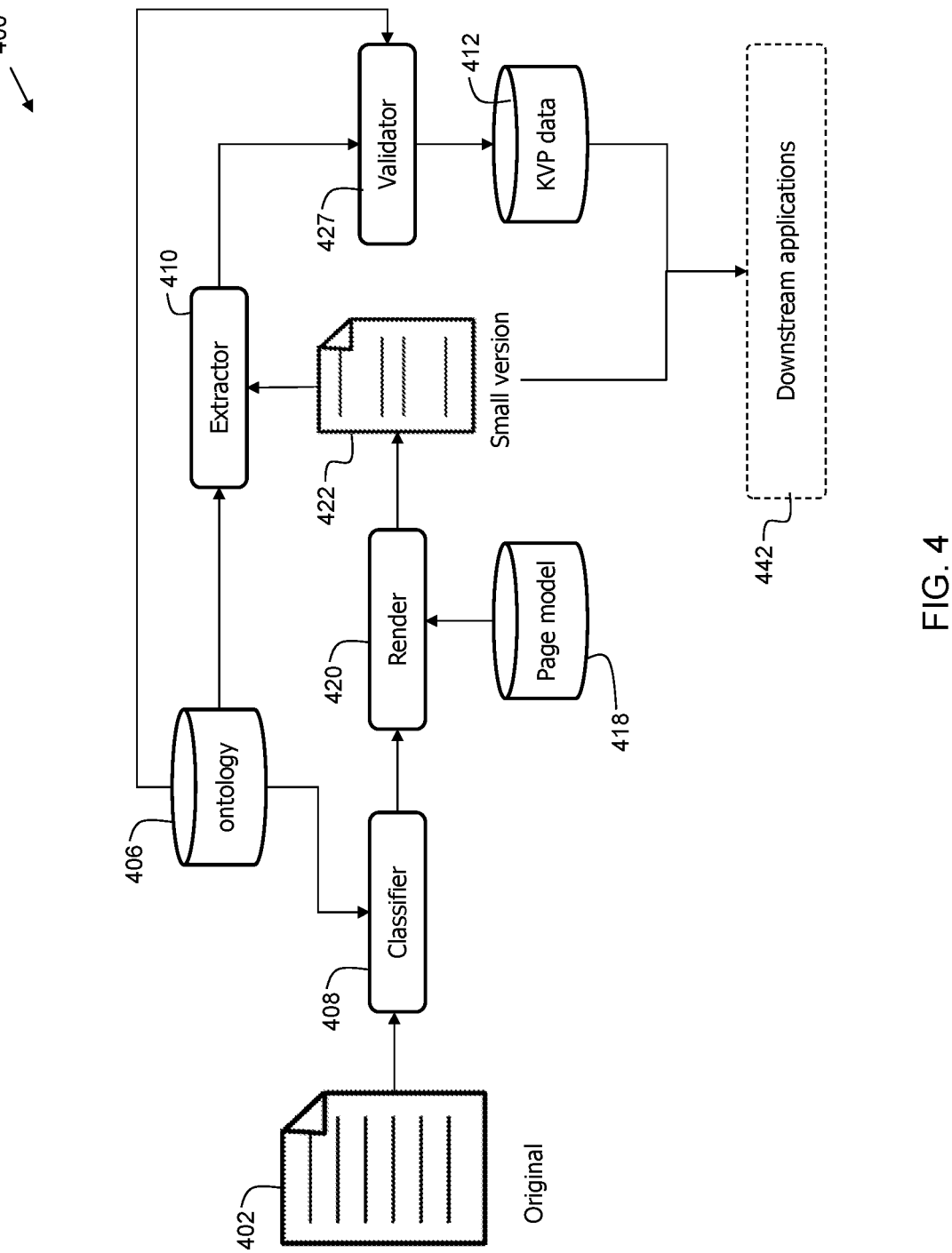
FIG. 4 is a block diagram illustrating system runtime operation in accordance with disclosed embodiments.

FIG. 4 is a block diagram 400 illustrating system runtime operation in accordance with disclosed embodiments. An original document 402 is input to the classifier 408. The classifier 408 determines a document type based on the ontology 406. The page model 418 corresponding to the document type, that was created during the training process, is input to the render module 420 to generate the small version 422 of the original document 402.

The render module 420 receives as input, pages that contain at least one KVP and/or supplemental pages, and compiles the pages into a smaller version. The pages may be non-contiguous in the original document. For example, pages 2, 33, and 35 from the original document may contain KVPs, and page 31 may be a supplemental page, that contains metadata pertaining to one or more KVPs. Using this example, the render module assembles pages 2, 31, 33, and 35 from the original document, and creates a four-page small version. Page 1 of the small version is page 2 of the original document, page 2 of the small version is page 31 of the original document, page 3 of the small version is page 33 of the original document, and page 4 of the small version is page 35 of the original document. In one or more embodiments, the output of the render module 420 is small version 422, where the small version 422 is a text file, PDF file, RTF file, docx file, or other suitable file type. The text can include ascii text, Unicode text, UTF-8 text, and/or other text representations. The small version 422 can be provided to the downstream applications 442. The downstream applications can operate on the small version 422 instead of the larger, original document 402 for tasks such as indexing, language translation, and so on, thereby saving considerable computing resources.

As an additional check, in one or more embodiments, the small version 422 is input into the extractor 410 which extracts KVPs based on the document type identified by the classifier 408. The extracted KVPs are input to the validator 427, which is a program, module, or application that can check for the presence of all KVPs designated as mandatory in the ontology. If one or more mandatory KVPs are not found in the small version 422, the validator 427 may indicate an error, prompting for manual intervention and/or system retraining. The KVPs extracted by the extractor 410 are stored in the KVP data 412, and may also be provided to the downstream applications 442. In one or more embodiments, the render module 420 creates a filename for the small version 422 that is based on the filename of the original document 402, with a suffix prepended to the file name. As an example, an original document having the filename 'MortgageApp_05262023' may have a corresponding small version with a filename 'MortgageApp_05262023_small' where the prefix '_small' is appended to the original filename. In this way, the original document and corresponding small versions have unique names, yet are similar so that the original document for a given small document can be identified by using the filename of the small version without the '_small' suffix.

The downstream applications 442 can include an indexer, as shown in 338 of FIG. 3. Embodiments can include performing indexing on the second document. In embodiments, the extraction is performed using a machine learning process. In embodiments, the machine learning process includes natural language processing. In embodiments, the extraction is performed using regular expressions.

In one or more embodiments, the extractor includes a regular expression (regex) engine for processing regular expressions in order to identify KVPs. The regex engine can include pattern matching functions to match text. The regex engine can also support metacharacters to represent different types of characters or character groups. For example, a dot (.) can be used to stipulate a match of a single character except a newline, an asterisk (*) can signify matching zero or more occurrences of the previous character or group, and square brackets ([ ]) define a character class, matching any character within the brackets. These are just some examples of various metacharacters that may be supported by the regex component within the indexer. The regex engine may also include one or more quantifiers. Quantifiers define the number of occurrences a pattern should match. Examples can include, but are not limited to, using "?" to specify a match of one occurrence, using "*" to specify a match of one or more occurrences, and/or using the form "{n, m}" to specify a match between n and m occurrences. Other quantifiers are possible in disclosed embodiments. In disclosed embodiments, the regex engine may act on the original document 402 and/or smaller version 422 in order to find, and/or confirm the existence of KVPs.

Figure 5:
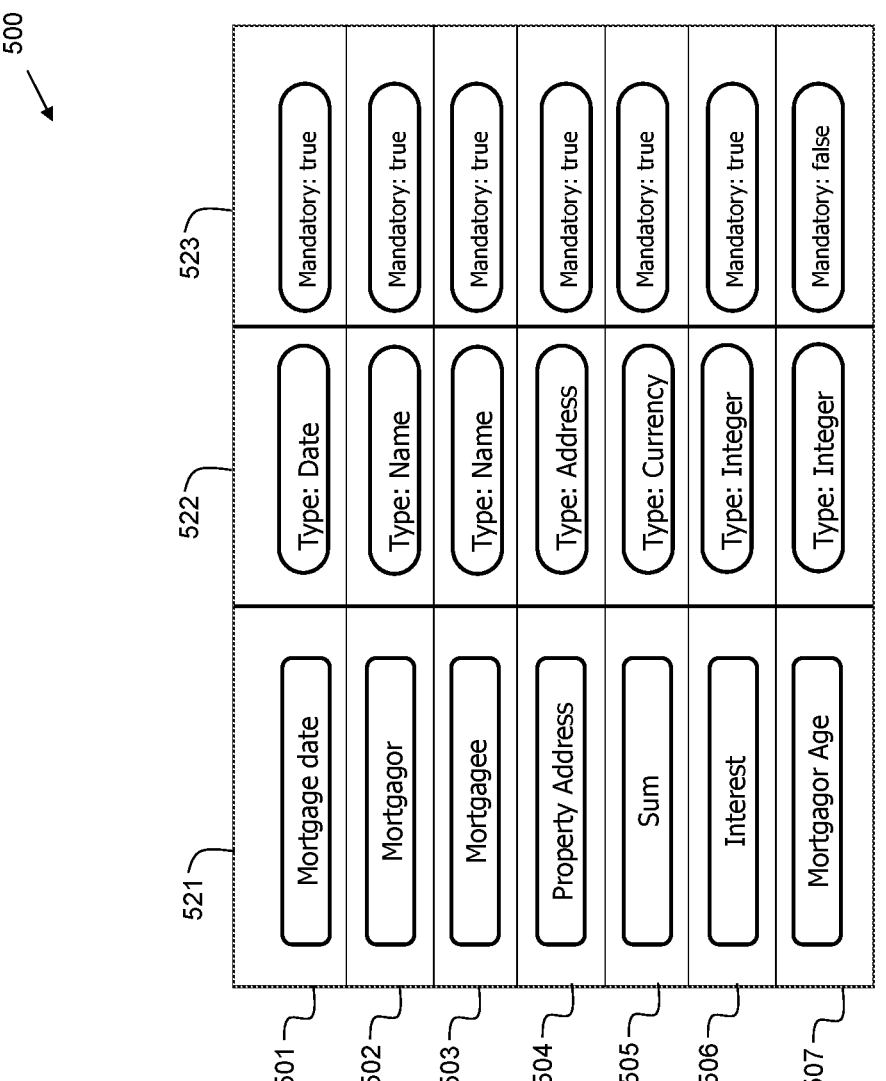
FIG. 5 is a table showing an exemplary ontology in accordance with disclosed embodiments.

FIG. 5 is a table 500 showing an exemplary ontology in accordance with disclosed embodiments. Table 500 may be stored in a computer-readable medium within, or accessible by, DAPS 202 (FIG. 2). Table 500 includes a field column 521, a type column 522, and a mandatory status column 523.

Column 521 includes a name for various fields. Column 522 includes a data type for a corresponding field in column 521. Column 523 includes the mandatory status for a corresponding field in column 521.

Table 500 includes seven rows, indicated as 501-507. Row 501 shows a field of mortgage date, having a data type of date, and a mandatory status of true. A mandatory status of true signifies that the field of mortgage date is required in the small version of the document. Row 502 shows a field of mortgagor, having a data type of name, and a mandatory status of true. Row 503 shows a field of mortgagee, having a data type of name, and a mandatory status of true. Row 504 shows a field of property address, having a data type of address, and a mandatory status of true. Row 505 shows a field of sum, having a data type of currency, and a mandatory status of true. Row 506 shows a field of interest, having a data type of integer, and a mandatory status of true. Row 507 shows a field of mortgagor age, having a data type of integer, and a mandatory status of false. The mandatory status of false for the field of mortgagor age indicates that the mortgagor age field is not required in the short version, even if it may exist in the original document. In embodiments, defining an ontology further comprises initializing a mandatory flag for each KVP of the plurality of KVPs. In embodiments, a validation process checks that each field designated as mandatory is found in a generated short version of a document. If a mandatory field (KVP) is missing in a short document, the disclosed embodiments may trigger a retraining process, and/or issue an alert for user intervention.

Figure 6:
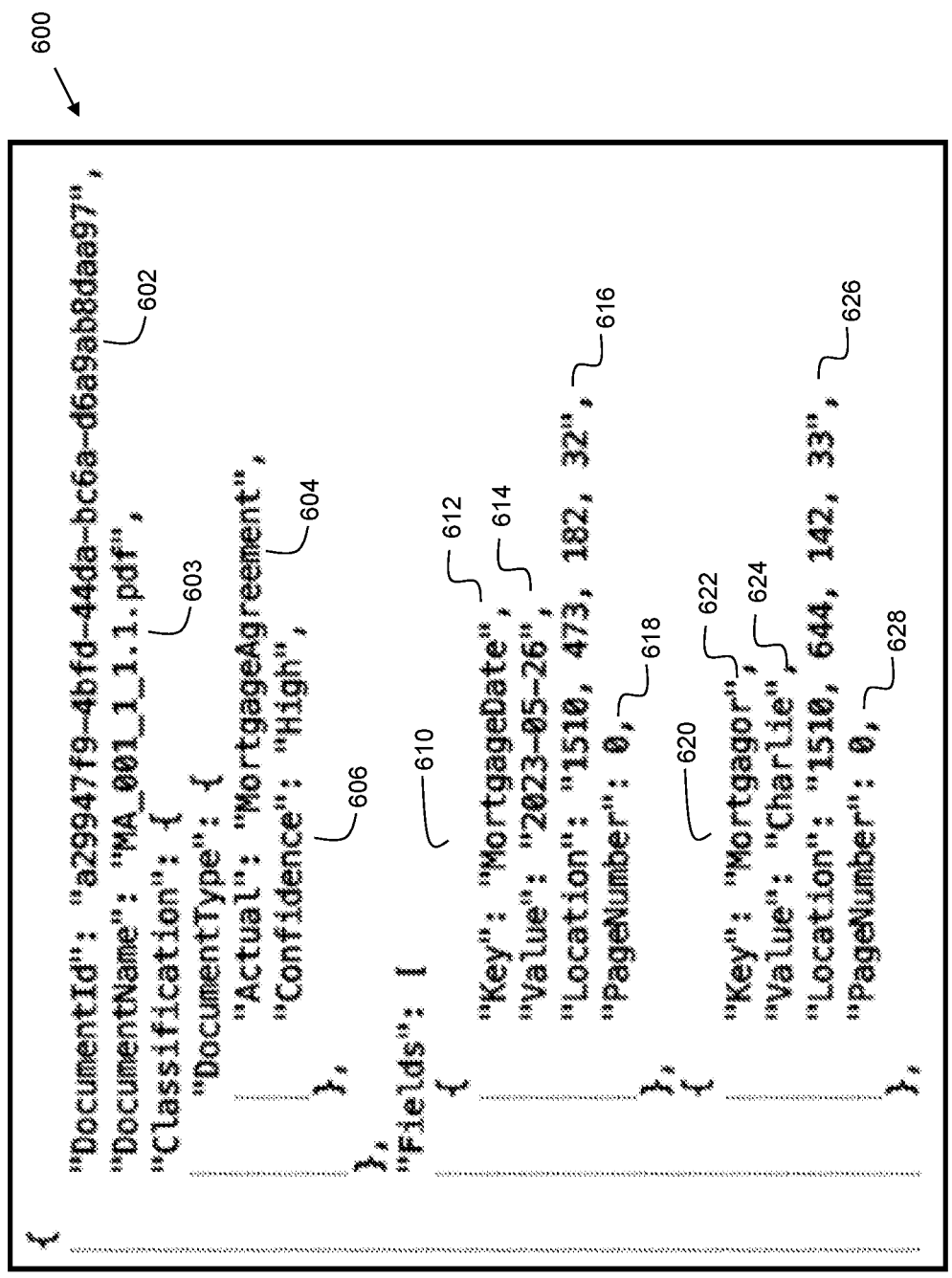
FIG. 6 shows exemplary storage of KVP information in accordance with disclosed embodiments.

FIG. 6 shows exemplary storage of document and KVP information 600 in accordance with disclosed embodiments. In one or more embodiments, KVP information for a document can be stored in a JSON (JavaScript Object Notation) file, XML (Extensible Markup Language) file, yaml file, or other suitable file format. Information 600 can include a document identifier 602. In embodiments, the document identifier can be a hash of document data such as one or more alphanumeric strings, and/or image data within a document. Information 600 can include a document name 603. In embodiments, the document name 603 is based on a filename for the original document. The information 600 can include a document type 604. In embodiments, the document type is determined by the classifier (e.g., 408 of FIG. 4). In embodiments, the information 600 further includes a confidence level 606. In one or more embodiments, the confidence level 606 can include an optical character recognition (OCR) confidence level.

In one or more embodiments, the confidence level 606 refers to a measure of the OCR algorithm's certainty or confidence in the accuracy of character recognition. In embodiments, when an OCR module processes an image or scanned document to extract text, it assigns a confidence level to each recognized character and/or word. The confidence level can reflect certainty about the accuracy of the recognized text. In embodiments, the confidence level can be represented as an enumerated string, numerical value, or percentage. In some embodiments, higher confidence numeric values indicate a higher level of confidence in the accuracy of the recognized text, while lower numeric values for a confidence level indicate a greater likelihood of errors or uncertainties. In embodiments, the confidence level can be used by the validator module to determine if retraining and/or user intervention is warranted.

The information 600 can include one or more KVPs. In the information 600 shown in FIG. 6, two KVPs are shown, indicated as 610 and 620. While two KVPs are shown in FIG. 6, more or fewer KVPs can be present in disclosed embodiments. Referring now to KVP 610, it includes a key of MortgageDate at 612, and a value of 2023-5-26 at 614. The KVP also includes location data, which can comprise a page number 618, and a location data field 616. In embodiments, the location data field can contain a set of Cartesian coordinates, and a height and width. In the example of KVP 610, the first two values in the location data field 616 represent an X coordinate (1510) and a Y coordinate (473). The second two values in the location data field represent a width (182), and a height (32). Referring now to KVP 620, it includes a key of Mortgagor at 622, and a value of 'Charlie' at 624. The KVP also includes location data, which can comprise a page number 628, and a location data field 626. In the example of KVP 620, the first two values in the location data field 626 represent an X coordinate (1510) and a Y coordinate (644). The second two values in the location data field represent a width (142), and a height (33).

In embodiments, the plurality of KVPs is stored in a JSON file, and page location data associated with each KVP is stored in the JSON file. In some embodiments, the page location data includes a page number, and Cartesian coordinates of the KVP. In embodiments, defining an ontology further comprises creating a document fingerprint for the first document. In embodiments, the document fingerprint can be based on a hash of text and/or image data within the original document.

FIG. 7 is an example 700 showing exemplary document sections containing KVPs in accordance with disclosed embodiments. Excerpt 711 is from page 2 of an original document, as indicated by reference number 713. Excerpt 721 is from page 33 of an original document, as indicated by reference number 723. Excerpt 711 includes KVP data of a date at 702, and a mortgage lender at 704. Similarly, excerpt 721 includes KVP data of a name of mortgage lender at 706. In embodiments, the KVP data can be identified via machine learning, natural language processing, regular expression processing, template matching, heuristics, and/or other suitable techniques. Excerpt 721 includes document identifier 705. In one or more embodiments, the document identifier is used by the classifier (e.g., 408 of FIG. 4), as part of an identification process for an incoming original document. In some embodiments, a hash of the identifier is used to form a fingerprint which serves as a unique identifier for a given document.

FIG. 8 shows an example 800 that includes a supplemental page in accordance with disclosed embodiments. Example 800 is from page 31 of an original document, as indicated by reference number 813. The example 800 does not contain any KVPs. However, example 800 contains metadata for a KVP, as signified by the text string indicated at 802. In embodiments, supplemental text strings are included in the ontology. When a supplemental text string is identified, pages from the original document that contain the supplemental text string can be included in the small version (e.g., 322 of FIG. 3). In this way, relevant information for KVPs can also be present in the small version, even if that relevant information is not on the same page as a KVP. Embodiments can include identifying a supplemental page of the first document based on the natural language processing, and including the supplemental page in the second document. In some embodiments, regular expressions are used to identify the presence of supplemental text strings within the original document (first document). If found, the page model (318 of FIG. 3) can be updated to include the supplemental page for inclusion in the small version (second document). In the example of FIG. 8, the supplemental text string 'Law and Consent to Jurisdiction' is found on page 31, and thus, page 31 of the original document is included in the small version.

Figure 9:
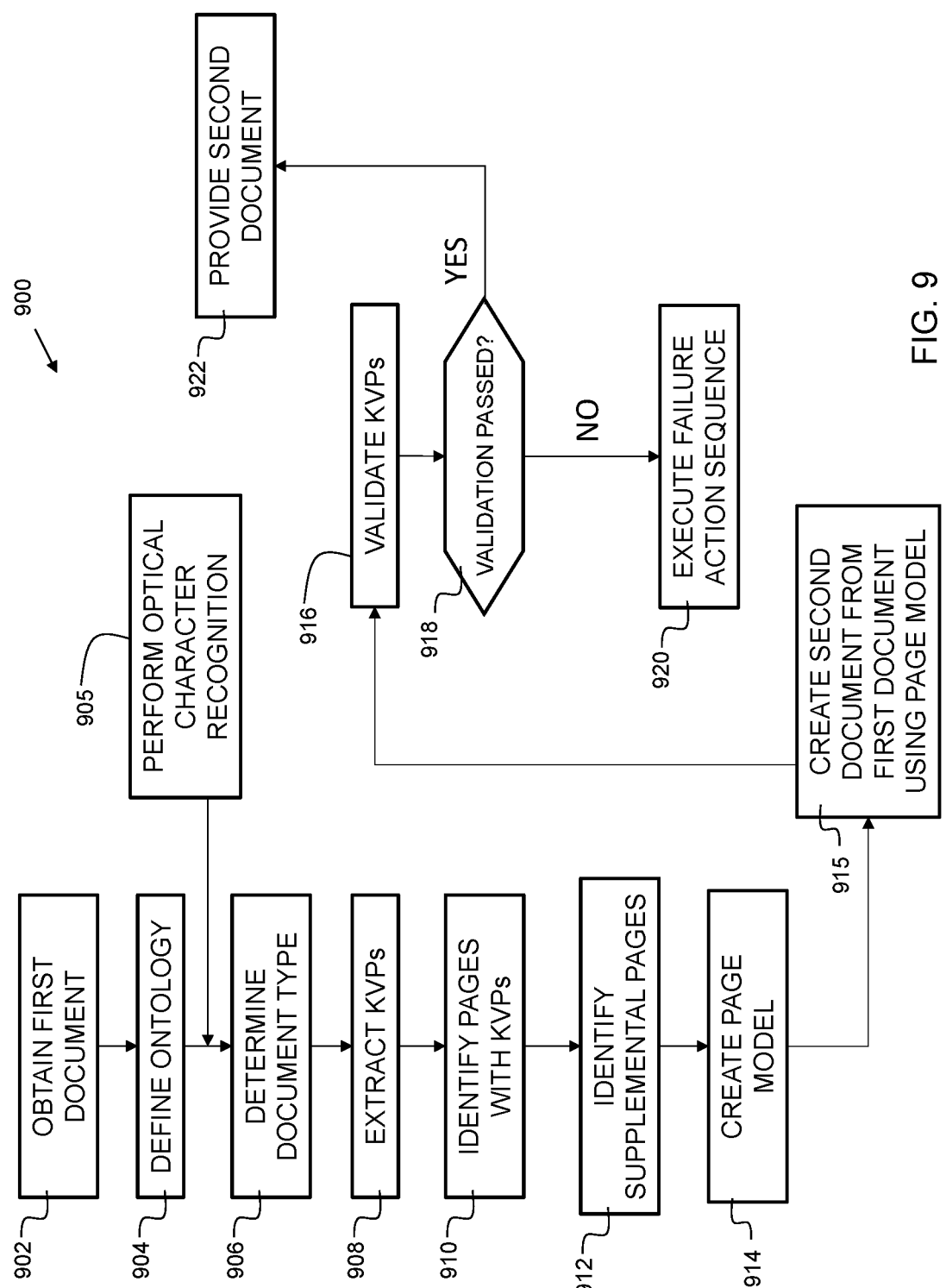
FIG. 9 is a flowchart indicating process steps for embodiments of the present invention.

FIG. 9 is a flowchart 900 indicating process steps for embodiments of the present invention. At block 902, a first document is obtained. The first document can be an original document. The first document can be a business document, legal document, and/or other suitable document. In some embodiments, the business document exceeds 30 pages. At block 904, an ontology is defined for the document type. In some embodiments, this can be performed via frequency analysis, determining common terms and/or words in a document, and/or manual entry of important terms to be used in KVPs. Optionally, at block 905, optical character recognition (OCR) is performed on the first document that was obtained at block 902. The OCR can include obtaining a document in an image format such as a JPEG, PNG, bitmap, or the like, and converting it to digital and editable format, such as plain text, docx, PDF, or HTML. At block 906, the document type is determined. The document type can be determined based on one or more attributes, such as a document title and/or a document number located on a cover page, and/or header/footer of pages of the original document. The title, document number, and/or other information can comprise a fingerprint for a document type that can be used to classify a document as belonging to a given type. At block 908, KVPs are extracted from the original document. At block 910, pages of the original document that include KVPs are identified (as shown in FIG. 7). At block 912, pages of the original document that are supplemental pages are identified (as shown in FIG. 8). At block 914, a page model is created. The page model can include information that includes page numbers for inclusion in a small version of an original document. In embodiments, the page model can be represented in a structured file format such as shown in FIG. 6.

At block 915, a second document is created from the first document using the page model as input to the render module (418 and 420 of FIG. 4). The first document can be an original document, and the second document can be a small version of the original document, where the small version contains a subset of the pages that are in the original document. After the second document is created, the small document can be input to the extractor (410 in FIG. 4) for validation of KVPs at block 916. The validation of KVPs can include confirming that all KVPs indicated as mandatory (see column 523 of FIG. 5) are present in the small document. If, at block 918, it is confirmed that all mandatory KVPs for the document type are present in the second document, then the second document is provided to a user and/or stored in the condensed document repository (219 of FIG. 2). If, at block 918, it is determined that at least one mandatory KVP is missing from the second document, then the process continues to 920, where a failure action sequence is executed. The failure action sequence can include, but is not limited to, retraining the system, alerting a user, editing the ontology, and/or other mitigation actions. If, at block 918, it is determined that all mandatory KVPs are present, the validation passes, and the process continues to block 922, where the second (condensed) document is provided to a user and/or loaded in the condensed document repository (219 of FIG. 2).

Figure 10:
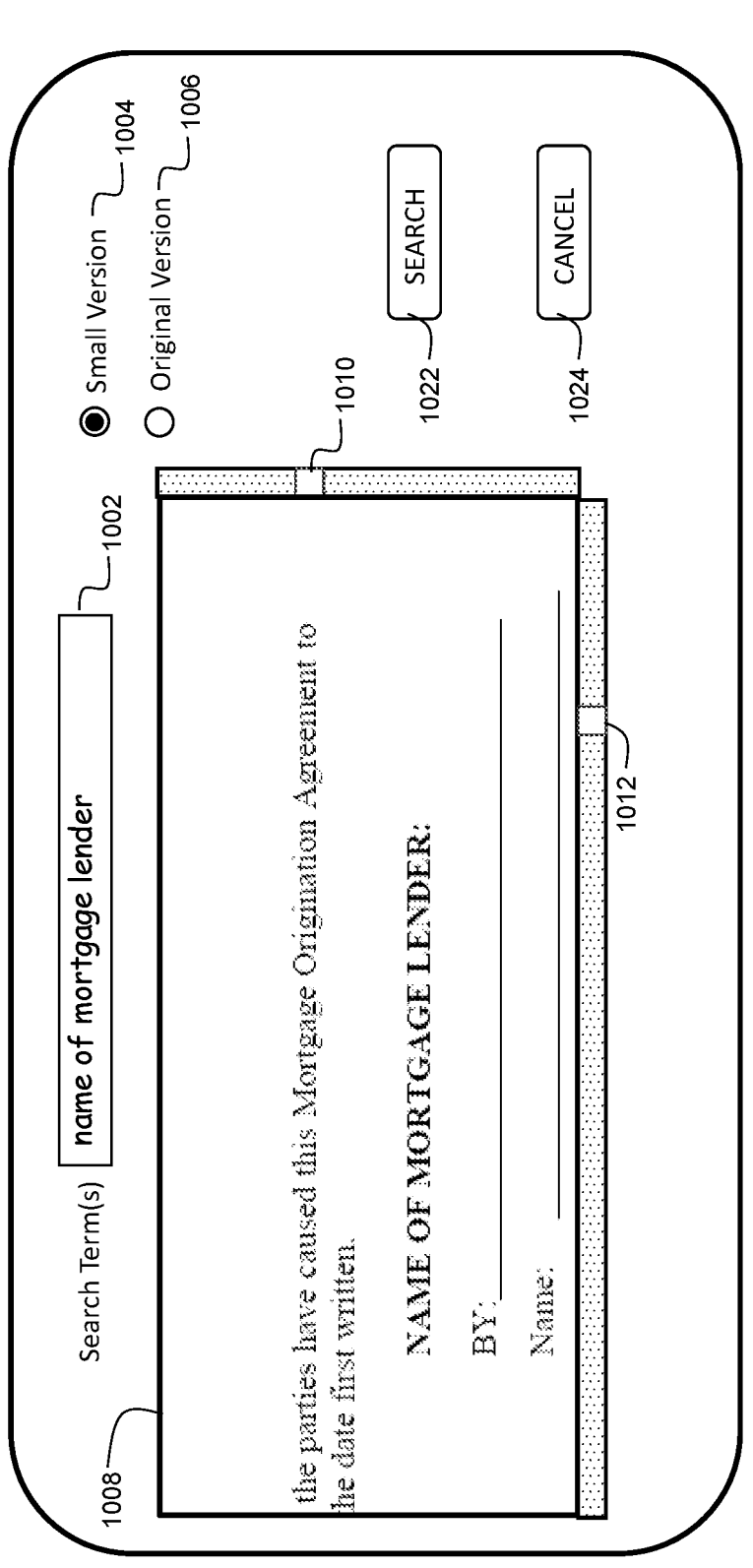
FIG. 10 is an exemplary user interface in accordance with disclosed embodiments.

FIG. 10 is an exemplary user interface 1000 in accordance with disclosed embodiments. In embodiments, user interface 1000 may be rendered on client device 216 (FIG. 2) via HTML, or a native application executing on client device 216. User interface 1000 includes a search term field 1002, which can receive one or more search terms. A small version radio button 1004, when selected, causes the DAPS 202 to search one or more documents within the condensed document repository 219. An original version radio button 1006, when selected, causes the DAPS 202 to search one or more documents within the original document repository 212. Once the term(s) are entered in field 1002, and the desired version repository is selected (1004 or 1006), the user can invoke the search button 1022 to start a search. The results of the search appear in the results pane 1008. In one or more embodiments, horizontal scroller control 1012 and vertical scroller control 1010 enable the user to navigate to other sections of the document. In embodiments, the user may cancel a search in progress by invoking the cancel button 1024. In one or more embodiments, invoking the search button 1022 and/or cancel button 1022 cause the client device 216 to invoke application programming interfaces (APIs) for interacting with the DAPS 202 (FIG. 2). The APIs can include RESTful APIs, HTTP calls, and so on. The user interface 1000 is merely exemplary, and other user interfaces are possible in disclosed embodiments. By providing an option for searching the small version or the original version of documents, disclosed embodiments can provide improved performance in many instances by limiting the search to the small version. In the event that the search of the small version does not produce the desired information, the user can select the original version in those cases to perform a search of all available material. Accordingly, disclosed embodiments provide improved performance and conservation of computing resources, while still enabling access to the complete information of the original document.

As can now be appreciated, disclosed embodiments provide improved computer-implemented techniques for analyzing and processing large documents. Business documents such as contracts, and/or financial reports may contain hundreds of pages. However, readers are usually interested in the important information that is contained within a few pages of these large documents. Thus, readers are forced to scroll through hundreds of pages to review the content that they are concerned with. In many cases. most pages in the documents are irrelevant when the documents are being processed by a business automation workflow or reviewed/searched by users.

Disclosed embodiments provide techniques for identifying the pages that contain relevant information automatically and generating a small document copy that only contains these relevant pages. Downstream applications can then process useful data (e.g., analyzing, indexing, redacting, etc.) upon the small version of the document without needing to process the large amounts of irrelevant data in the original document. For the downstream applications, processing the small version document can improve efficiency, reducing storage space and minimizing computational cost.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for document processing, comprising:

defining an ontology for a first document, wherein defining the ontology further comprises creating a document fingerprint for the first document, wherein the document fingerprint is a hash of character and image data within the first document;

determining a document type for the first document, based on the ontology associated with the first document, wherein the first document includes a plurality of pages;

training a machine learning process that includes a neural network and a natural language processing (NLP) module;

extracting a plurality of key-value pairs (KVPs) from the first document based on the determined document type, wherein the extracting is performed using the trained machine learning process that includes the neural network and the NLP module;

identifying an excerpt of the first document that contains a KVP of the plurality of KVPs;

creating a condensed document, wherein the condensed document includes the identified excerpt of the first document, and wherein the condensed document excludes at least one other excerpt of the first document that is not identified as containing a KVP of the plurality of KVPs;

performing indexing on the condensed document by:

performing preprocessing on the condensed document, wherein the preprocessing includes tokenization, lowercasing, and removal of stop words;

extracting individual terms from the preprocessed condensed document;

filtering out a portion of the individual terms to generate a subset of terms; and characterizing a frequency of each of the subset of terms; and providing the condensed document to a downstream application, and wherein, during a runtime operation, the downstream application is configured to utilize input from the condensed document.

2. The method of claim 1, wherein defining the ontology further comprises initializing a mandatory flag for each KVP of the plurality of KVPs.

3. The method of claim 2, further comprising performing validation on each KVP of the plurality of KVPs, based on a setting of the mandatory flag.

4. The method of claim 3, wherein the performing the validation comprises:

in response to a first KVP of the plurality of KVPs not appearing in the condensed document:

generating an alert indicating that the first KVP does not appear in the condensed document.

5. The method of claim 3, wherein the performing the validation comprises:

in response to a first KVP of the plurality of KVPs not appearing in the condensed document:

retraining the machine learning process to include the first KVP of the plurality of KVPs in the condensed document.

6. The method of claim 1, further comprising:

identifying a supplemental excerpt of the first document based on the natural language processing module, the supplemental excerpt containing metadata associated with the KVP; and including the supplemental excerpt in the condensed document.

7. The method of claim 1, wherein the extracting is performed using regular expressions.

8. The method of claim 1, wherein the KVP is one of a plurality of KVPs stored in a JSON file, wherein the excerpt is a page, and wherein page location data associated with the KVP is stored in the JSON file.

9. The method of claim 8, wherein the page location data includes a page number, and Cartesian coordinates of the KVP.

10. The method of claim 9, wherein the page location data includes a height of the KVP and a width of the KVP.

11. The method of claim 1, further comprising:

receiving, from a client device, search terms related to the first document, wherein a radio button identifying the condensed document is selected on a user interface of the client device; and executing a search of the search terms on the indexed condensed document based on the radio button identifying the condensed document being selected.

12. An electronic computation device comprising:

a processor;

a memory coupled to the processor, the memory containing instructions, that when executed by the processor, cause the electronic computation device to:

define an ontology for a first document, wherein defining the ontology further comprises creating a document fingerprint for the first document, wherein the document fingerprint is a hash of character and image data within the first document;

determine a document type for the first document, based on the ontology associated with the first document, wherein the first document includes a plurality of pages;

train a machine learning process that includes a neural network and a natural language processing (NLP) module;

extract a plurality of key-value pairs (KVPs) from the first document based on the determined document type, wherein the extracting is performed using the trained machine learning process that includes the neural network and the NLP module;

identify an excerpt of the first document that contains a KVP of the plurality of KVPs;

create a condensed document, wherein the condensed document includes the identified excerpt of the first document, and wherein the condensed document excludes at least one other excerpt of the first document that is not identified as containing a KVP of the plurality of KVPs; and perform indexing on the condensed document by:

performing preprocessing on the condensed document, wherein the preprocessing includes tokenization, lowercasing, and removal of stop words;

extracting individual terms from the preprocessed condensed document;

filtering out a portion of the individual terms to generate a subset of terms; and characterizing a frequency of each of the subset of terms; and provide the condensed document to a downstream application, and wherein, during a runtime operation, the downstream application is configured to utilize input from the condensed document.

13. The electronic computation device of claim 12, wherein the KVP is one of a plurality of KVPs stored in a JSON file, wherein the excerpt is a page, wherein page location data associated with the KVP is stored in the JSON file, wherein the page location data includes a page number, Cartesian coordinates of the KVP, a height of the KVP, and a width of the KVP.

14. The electronic computation device of claim 12, wherein the memory further comprises instructions, that when executed by the processor, cause the electronic computation device to initialize a mandatory flag for each KVP of the plurality of KVPs.

15. The electronic computation device of claim 14, wherein the memory further comprises instructions, that when executed by the processor, cause the electronic computation device to perform validation on each KVP of the plurality of KVPs, based on a setting of the mandatory flag.

16. A computer program product for an electronic computation device comprising a computer readable storage medium having program instructions embodied therewith, the program instructions executable by a processor to cause the electronic computation device to:

define an ontology for a first document, wherein defining the ontology further comprises creating a document fingerprint for the first document, wherein the document fingerprint is a hash of character and image data within the first document;

determine a document type for the first document, based on the ontology associated with the first document, wherein the first document includes a plurality of pages;

train a machine learning process that includes a neural network and a natural language processing (NLP) module;

extract a plurality of key-value pairs (KVPs) from the first document based on the determined document type, wherein the extracting is performed using the trained machine learning process that includes the neural network and the NLP module;

identify an excerpt of the first document that contains a KVP of the plurality of KVPs;

create a condensed document, wherein the condensed document includes the identified excerpt of the first document, and wherein the condensed document excludes at least one other excerpt of the first document that is not identified as containing a KVP of the plurality of KVPs; and perform indexing on the condensed document by:

performing preprocessing on the condensed document, wherein the preprocessing includes tokenization, lowercasing, and removal of stop words;

extracting individual terms from the preprocessed condensed document;

filtering out a portion of the individual terms to generate a subset of terms; and characterizing a frequency of each of the subset of terms; and provide the condensed document to a downstream application, and wherein, during a runtime operation, the downstream application is configured to utilize input from the condensed document.

17. The computer program product of claim 16, wherein the computer readable storage medium further comprises program instructions, that when executed by the processor, cause the electronic computation device to initialize a mandatory flag for each KVP of the plurality of KVPs.

18. The computer program product of claim 17, wherein the computer readable storage medium further comprises program instructions, that when executed by the processor, cause the electronic computation device to perform validation on each KVP of the plurality of KVPs, based on a setting of the mandatory flag.

19. The computer program product of claim 16, wherein the KVP is one of a plurality of KVPs stored in a JSON file, wherein the excerpt is a page, wherein page location data associated with the KVP is stored in the JSON file, wherein the page location data includes a page number, Cartesian coordinates of the KVP, a height of the KVP, and a width of the KVP.

* * * * *